United States Patent Office 2,870,190
Patented Jan. 20, 1959

2,870,190
PHOSPHONATE COMPOUNDS

Bill E. Burgert and Henry Tolkmith, Midland, Mich., assignors to The Dow Chemical Company, Midland, Mich., a corporation of Delaware No Drawing. Application July 3, 1957
Serial No. 669,718

5 Claims. (Cl. 260—461)

The present invention relates to phosphonate compounds having the formula

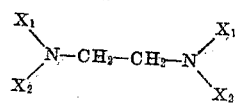

In this and succeeding formulas, $X_1$ represents $X_2$ or hydrogen and $X_2$ represents a radical having the formula

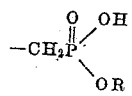

wherein R is a lower alkyl radical. The expression "lower alkyl" is employed in the present specification and claims to refer to the alkyl radicals containing from 1 to 4 carbon atoms, inclusive. These new compounds are very viscous liquids which are readily soluble in water and somewhat soluble in many organic solvents. They have been found to be useful as parasiticides and are adapted to be employed as active toxic constituents of dust and liquid compositions for the control of many insect and fungal pests such as *Alternaria solani*, *Fusarium solani*, *Pythium spp.* and *Rhizoctonia solani*.

The new compounds may be prepared by causing a reaction between ethylenediamine, formaldehyde and a dialkyl phosphite of the formula

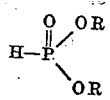

Where it is desired to introduce two $-CH_2PO(OH)(OR)$ groups into the molecule, one molecular proportion of ethylenediamine is employed with two molecular proportions of formaldehyde and two molecular proportions of dialkylphosphite. Where it is desired to introduce four $-CH_2PO(OH)(OR)$ groups into the molecule, one molecular proportion of ethylenediamine is employed with four molecular proportions of each of the formaldehyde and dialkyl phosphite reactants. Although the details of the reaction mechanism are not completely understood, the reaction takes place smoothly at the temperature range of from 0° to 50° C. with the formation of the desired product and alkanol of reaction. The reaction is somewhat exothermic and the temperature may be controlled by regulating the rate of contacting the reactants and by external cooling. Upon completion of the reaction, the reaction mixture is fractionally distilled under reduced pressure to separate low boiling constituents and obtain the desired product as a liquid residue.

In carrying out the reaction, a mixture of ethylenediamine and dialkyl phosphite is contacted portionwise with an aqueous solution of formaldehyde. This operation is carried out with stirring and at a temperature of from 0° to 50° C. Upon completion of the reaction, the reaction mixture is fractionally distilled under reduced pressure at gradually increasing temperatures up to a temperature of 150° C. to separate low boiling constituents and obtain the desired product as a liquid residue. Since the desired products are somewhat unstable at temperatures in excess of 150° C., exposure to such elevated temperatures for any appreciable period should be avoided.

The following examples illustrate the invention but are not to be construed as limiting:

*Example 1.*—*Ethylenediamine N,N'-bis(O-ethyl methanephosphonate)*

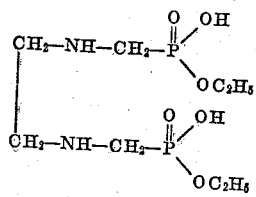

A 37 percent aqueous solution of formaldehyde containing 16.5 grams (0.55 mole) of formaldehyde was added portionwise with stirring to a mixture of 15 grams (0.25 mole) of ethylenediamine and 75.9 grams (0.55 mole) of O,O-diethylphosphite. The addition was carried out in 15 minutes and at a temperature of from 25° to 35° C. Following the addition, stirring was continued for 40 minutes, and the reaction mixture thereafter diluted with 70 grams of methylcyclohexane. The resulting mixture was fractionally distilled under reduced pressure at temperatures gradually increasing up to 150° C. to remove low boiling constituents and obtain an ethylenediamine N,N'-bis(O-ethylmethanephosphonate) product as a dark brown, very viscous, liquid residue having a density of 1.4 at 25° C. This product was found to contain 9.27 percent nitrogen, 20.50 percent phosphorus and 7.09 percent hydrogen compared to the calculated values 9.21, 20.40 and 7.29 percent, respectively.

*Example 2.*—*Ethylenediamine N,N',N'-tetra (O-ethyl methanephosphonate)*

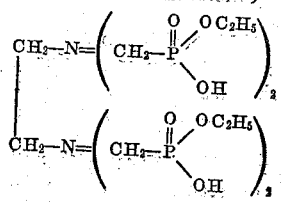

A 37 percent aqueous solution of formaldehyde containing 24 grams (0.80 mole) of formaldehyde was added portionwise with stirring to a mixture of 9 grams (0.15 mole) of ethylenediamine and 109.1 grams (0.80 mole) of O,O-diethyl phosphite. The addition was carried out in 15 minutes and at a temperature of from 20° to 30° C. Following the addition, stirring was continued for 90 minutes to complete the reaction. The reaction mixture was then processed as described in Example 1 to obtain an ethylenediamine N,N,N',N' - tetra(O - ethyl methanephosphonate) product as a light tan, viscous, liquid residue having a density of 1.2 at 25° C. This product contained 5.49 percent nitrogen and 20.86 percent phosphorus compared to the theoretical values of 5.11 percent and 22.16 percent, respectively.

*Example 3.*—*Ethylenediamine N,N'-bis(O-isopropyl methanephosphonate)*

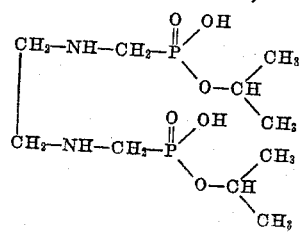

A 37 percent aqueous solution of formaldehyde containing 16.5 grams (0.55 mole) of formaldehyde is added portionwise with stirring to a mixture of 15 grams (0.25 mole) of ethylenediamine and 101 grams (0.55 mole) of O,O-diisopropyl phosphite. The addition is carried out in 30 minutes and at a temperature of from 15° to 25° C. The reaction mixture is then processed as described in Example 1 to obtain an ethylenediamine N,N'-bis(O-isopropyl methanephosphonate) product as a viscous liquid residue which has a molecular weight of 332.

*Example 4.—Ethylenediamine N,N,N',N'-tetra(O-normalbutyl methanephosphonate)*

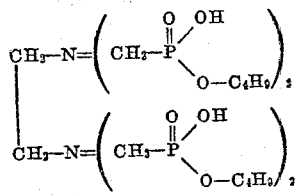

A 37 percent aqueous solution of formaldehyde containing 8.1 grams (0.21 mole) of formaldehyde was added portionwise with stirring to a mixture of 3 grams (0.05 mole) of ethylenediamine and 41 grams (0.21 mole) of O,O-dinormalbutyl phosphite. The addition was carried out in 15 minutes and at a temperature of from 25° to 53° C. Upon completion of the reaction, the reaction mixture was fractionally distilled under reduced pressure and at temperatures gradually increasing up to 150° C. to obtain an ethylenediamine N,N,N',N'-tetra(O-normalbutyl methanephosphonate) product as a dark brown, very viscous liquid residue. This product was found to contain 13.66 percent phosphorus and 3.27 percent nitrogen as compared to the calculated values of 14.02 percent and 3.16 percent, respectively.

In a similar manner, other ethylenediamine N-methyl-phosphonates may be prepared as follows:

Ethylenediamine N,N'-bis(O-methyl methanephosphonate) by the reaction of one molecular proportion of ethylenediamine with two molecular proportions of formaldehyde and two molecular proportions of O,O-dimethyl phosphite.

Ethylenediamine N,N'-bis(O-isobutyl methanephosphonate) by the reaction of one molecular proportion of ethylenediamine with two molecular proportions of formaldehyde and two molecular proportions of O,O-diisobutyl phosphite.

Ethylenediamine N,N,N',N'-tetra(O-methyl methanephosphonate) by the reaction of one molecular proportion of ethylenediamine with four molecular proportions of formaldehyde and four molecular proportions of O,O-dimethyl phosphite.

Ethylenediamine N,N,N',N' - tetra(O - normalpropyl methanephosphonate) by the reaction of one molecular proportion of ethylenediamine with four molecular proportions of formaldehyde and four molecular proportions of O,O-dinormalpropyl phosphite.

The new phosphonate compounds of the present invention are effective as parasiticides and may be employed to control many agricultural pests such as *Alternaria solani*, *Rhizoctonia solani* and two-spotted spider mites. For such use, the compounds may be dispersed on a finely divided carrier and employed as dusts. The new compounds may also be employed in oils, as constituents in water emulsions or in water dispersions. In representative operations, the spores of *Rhizoctonia solani* have been contacted with aqueous compositions containing 10 parts by weight of ethylenediamine N,N,N',N'-tetra(O-ethyl methanephosphonate) per million parts by weight of ultimate mixture. In such operations substantially complete controls of *Rhizoctonia solani* were obtained.

We claim:

1. A phosphonate compound corresponding to the general formula

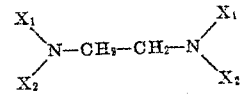

wherein $X_1$ represents a member of the group consisting of $X_2$ and hydrogen and $X_2$ represents

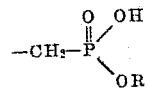

wherein R is a lower alkyl radical.

2. Ethylenediamine N,N'-bis(O-ethyl methanephosphonate).

3. Ethylenediamine N,N,N',N'-tetra(O-ethyl methanephosphonate).

4. Ethylenediamine N,N,N',N' - tetra(O - normalbutyl methanephosphonate).

5. A method of preparing a compound corresponding to the general formula

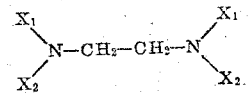

wherein $X_1$ represents a member of the group consisting of $X_2$ and hydrogen and $X_2$ represents

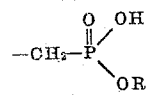

wherein R is a lower alkyl radical which comprises reacting together one molecular proportion of ethylenediamine and at least two molecular portions of each of formaldehyde and an O,O-di (lower alkyl) phosphite.

No references cited.